F. J. SNOOK.
COVER FOR HERMETICALLY SEALED TINS.
APPLICATION FILED JAN. 11, 1922.
1,418,029.
Patented May 30, 1922.
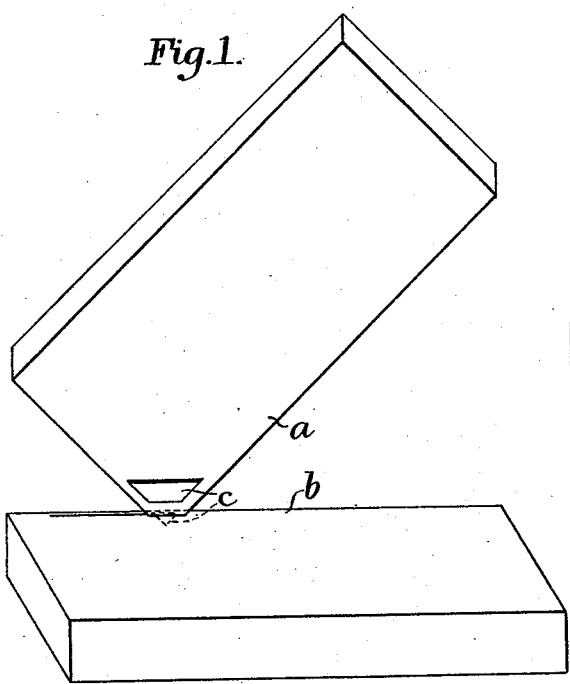
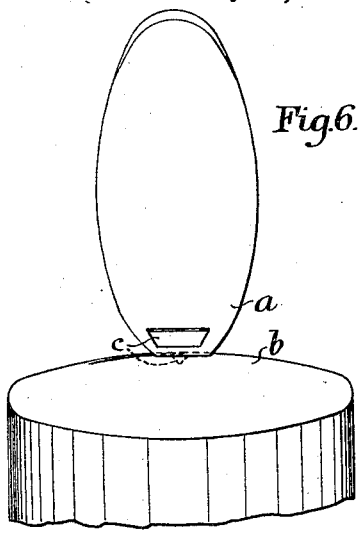
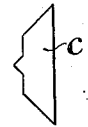
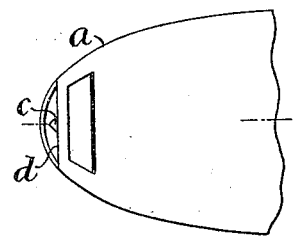
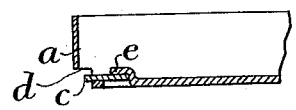
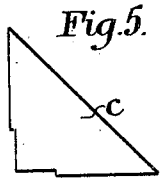
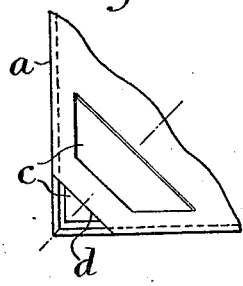
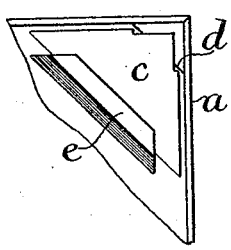
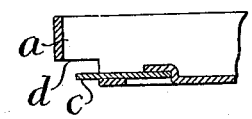
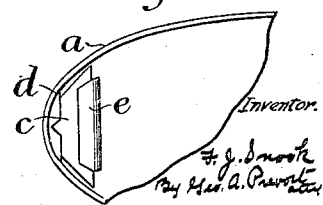

UNITED STATES PATENT OFFICE.

FREDERICK JOSEPH SNOOK, OF SALISBURY, ENGLAND.

COVER FOR HERMETICALLY-SEALED TINS.

1,418,029.        Specification of Letters Patent.    Patented May 30, 1922.

Application filed January 11, 1922. Serial No. 528,502.

*To all whom it may concern:*

Be it known that I, FREDERICK JOSEPH SNOOK, a subject of the King of Great Britain, residing at 9 Wyndham Road, Salisbury, Wilts, England, have invented new and useful Improvements Relating to Covers for Hermetically-Sealed Tins, of which the following is a specification.

My invention relates to hermetically sealed tins of all shapes including rectangular, cylindrical or oval and has for its object an easy and convenient method of opening the tin by means of a specially devised lid with cutter attached thereto. Various devices have been previously proposed for cutting out the tops of hermetically sealed tins of various shapes by means of one or more cutters attached to the lid so that the tin when opened remains serviceable with its lid intact. The shapes of tins used for packing various goods differ according to various requirements and it will be a great advantage to have one uniform type of lid cutter equally suitable for all.

The cutters previously proposed have often been of such a shape that they will not lie flat, that the cutting edge is at right angles to the top of the lid, that the method of attachment to the lid is not very simple, and moreover, in most of the previous proposals, the cutter has to be moved or slid into the cutting position. These features mean greater expense in manufacture on the one hand and on the other hand a much less effective cutter lid than the one now proposed. Further the previous proposals are only of use in the case of lids which can be manipulated by a single hand grip.

According to the invention I cut away the lid and the flange or rim thereof to form an opening, the cut edges of which are adapted, when the lid is removed from the sealed tin, to fit around the angle between the body and the end to be opened and I arrange a cutting blade in the plane of the lid, the point of which blade projects slightly beyond the cut edge of the latter. By this construction if the lid be applied to the said angle of the sealed tin with the blade perpendicular to the end to be opened and the said blade be pressed through and drawn around the said end to cut out the latter and detach it from the tin, the cut edges of the lid and flange will act as gauges to determine the depth of the cutter and the distance of the cut made from the side of the tin.

In a suitable arrangement for carrying out my invention the cutter is flat and is held permanently in the cutting position by the sides or flanges of the lid, the lid itself and by a flap or clip on the lid. When held in the cutting position, the whole weight of the lid and the pressure applied to the lid is directly over the cutter and not at right angles to it as in many other devices, previously proposed.

To enable the invention to be fully understood I will describe it by reference to the accompanying drawing, in which:—

Figure 1 is a perspective view of a sealed tin of square form in plan the slip-on lid of which is constructed in accordance with the invention and is shown in position for cutting out the top of the tin.

Figure 2 is a plan of the portion of the lid which carries the cutter and

Figure 3 is a section on the line A—B Figure 2.

Figure 4 is an underside view of the part of the lid shown in Figure 2 and

Figure 5 is a plan of the cutter detached.

Figures 6 to 10 are views similar to Figures 1 to 5, respectively, showing the invention applied to the lid of a box of oval form in plan.

$a$ is an ordinary slip-on lid of a sealed tin $b$, $c$ is the flat cutter arranged, in the case of a rectangular tin, at one corner of the lid, see Figures 1 to 5, and in the case of an oval tin at one end of the lid, see Figures 6 to 10. In the case of a cylindrical tin the cutter $c$ is arranged at any point in the circumference of the slip-on lid therefor.

$d$ indicates where the lid $a$ and the sides or flanges thereof are cut away, the cutting point of the cutter $c$ projecting beyond the cut edge of the lid but not beyond the edge of the tin when the lid is in position thereon.

The cutter $c$ is held permanently in the cutting position by the sides or flanges of the lid itself and by a flap or clip $e$ of the lid passing behind the cutter, see Figures 3 and 8.

To open the tin $b$ the lid $a$ is removed and held with its top facing towards the sealed top of the tin but perpendicular thereto. The point of the cutter is then forced downwards through the sealing material at the top of the tin, see Figures 1 and 6, and the lid moved so that the cutter $c$ is forced edgeways in close proximity to the outside edge of the top of the tin and the latter completely cut out or detached. In the act of cutting round the top of the tin it will be seen that the cutter is kept true to its work and within a short distance of the edge of the tin by the sides or flanges of the lid itself. When the operation is complete the lid can be replaced and used again as an ordinary lid.

Claims:

1. A slip-on lid for a sealed tin wherein the lid and flange or rim are cut away to form an opening therein, the cut edges of which fit the angle between the body and the end of the tin to be opened when the lid is applied thereto perpendicularly to the said end and wherein a flat cutting blade is arranged in the plane of the lid with its cutting end projecting beyond the cut edge thereof.

2. A slip-on lid for a sealed tin as claimed in claim 1, wherein the cutter abuts against converging sides of the lid flange or rim and is locked to the lid by a clip thereon.

FREDERICK JOSEPH SNOOK.